Inventors,
Willard F. M. Gray,
Frank S. Nichols,
by Francis K. Coyle
His Attorney.

United States Patent Office 3,427,578
Patented Feb. 11, 1969

3,427,578
COIL WINDING OF BARE WIRE AND SEPARATE INSULATION AND METHOD OF MAKING SUCH COIL
Willard F. M. Gray, Hancock, and Frank S. Nichols, Pittsfield, Mass., assignors to General Electric Company, a corporation of New York
Filed Nov. 14, 1966, Ser. No. 598,142
U.S. Cl. 336—206                                    5 Claims
Int. Cl. H01f 27/30, 41/04

ABSTRACT OF THE DISCLOSURE

A coil comprising an insulating tape and a bare wire wound together with the insulating tape providing a single thickness of tape between adjacent turns of bare wire and a plurality of thicknesses of tape between adjacent layers of the coil. The insulating tape is substantially wider than the bare wire and the bare wire is wound over each turn of tape substantially in the center thereof with portions of the strip of tape extending on both sides of the bare wire. The strip of tape at the beginning and end of each layer is folded over the bare wire to provide edge insulation.

---

This invention relates to coil windings for electrical apparatus and more particularly to coil windings having bare wire with separate insulation and to the method of making such coils.

In the electrical apparatus field it is well known that electrical coils are used for the making of such apparatus. The electrical coils are usually made from insulated electrical conductors which are wound on a mandrel or winding form to provide the desired coil structure. The electrical conductors used may be insulated with a continuous resinous enamel film which is coated on the conductor in a wire mill or oven. Another type of insulation used on such conductors is in the form of an insulating tape which is usually helically wound about the electrical conductor. In either instance the conductor is usually prepared with this insulation and then stored on a reel until used for the making of a coil winding.

It is well known in the making of coil windings for electrical apparatus that two types of insulation are necessary. These types of insulation are the turn to turn insulation and the layer to layer insulation. The turn to turn insulation is that insulation between adjacent turns of the electrical conductor in the same layer. There is only a small voltage gradient between adjacent turns in the same layer and therefore the turn to turn insulation need be only sufficient to withstand this small voltage gradient. However, the voltage gradient between the various layers of the coil may vary greatly and are normally of much greater strength than the turn to turn voltage gradient. Consequently a much stronger insulation is required between the various layers of a coil.

In the present state of the coil winding art it is usual to wind such coils of insulated wire of the types previously mentioned with the insulation being sufficient to provide the necessary turn to turn insulation. This insulation however is not sufficient to provide the necessary layer insulation. The usual practice in the coil winding art is to provide a separate layer to layer insulation, usually in the form of insulated sheets such as paper, cloth or the like. A construction of this type is described, for example, in Patent No. 2,985,950. This type of coil is relatively expensive to manufacture both from the standpoint of materials used and the time and labor necessary to construct the coil.

It is obvious that a coil which does not use pre-insulated wire would be less expensive in as much as the time and expense necessary to pre-insulate the wire either with a resinous enamel coating or an insulated tape wound about the wire could be eliminated. Further a coil in which the turn to turn and layer insulation were provided substantially simultaneously would be less expensive as to both the time and labor required for winding such coil. According to this invention it has been discovered that a coil can be made using bare wire and applying both the turn to turn and the layer insulation to such bare wire as it is being wound into a coil. The amount of layer insulation provided may be varied as necessary, in accordance with the type of coil being wound, without changing the turn to turn insulation.

It is therefore one subject of this invention to provide a novel method of winding a coil.

A further object of this invention is to provide a novel coil formed from bare wire.

A still further object of this invention is to provide a novel coil and a novel method of winding such coil in which a bare wire is used and the necessary insulation for both turn to turn and layer to layer is provided at the time of winding the coil.

In carrying out this invention in one form, a novel coil is provided by winding a bare wire on a winding form. Insulation in the form of a strip or tape of any desired insulation material is provided and is wound on the winding form with the bare wire. The insulating tape is substantially wider than the wire and in the preferred form a turn of tape is first placed on the winding form with a turn of wire placed over the tape. A portion of the tape extends beyond the wire on both sides. The next turn of tape is placed above the first wire turn with the tape extending beyond such turn, and on to the winding form. The next turn of wire is placed beside the first turn but overlying the second turn of tape thereby forcing the tape between the two wire turns and under the second wire turn. The winding continues in this manner with the extending portion of the tape providing the necessary layer to layer insulation while that between adjacent turns provides the desired turn to turn insulation.

The invention which is sought to be protected will be particularly pointed out and distinctly claimed in the claims which are appended hereto. However, it is believed that this invention and the manner in which its various objects and advantages are obtained, as well as other objects and advantages thereof, will be better understood from the following detailed description of a preferred embodiment thereof, particularly when taken in conjunction with the accompanying drawing, in which:

Figure 1:
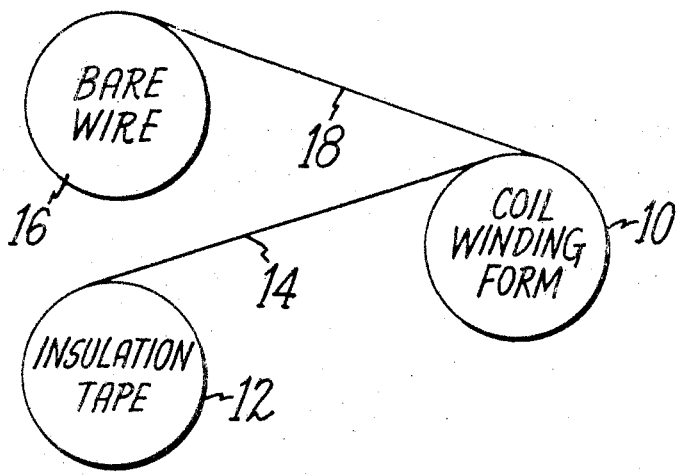
FIGURE 1 is a diagrammatic view of one form of carrying out this invention.

Reference will now be made to the drawing in which like numerals are used to indicate like parts throughout the various views. Referring first to FIGURE 1 there is shown in diagrammatic form one method of making the coil of this invention. As shown in FIGURE 1 a coil winding form or mandrel 10 is provided, driven in any desired manner (not shown). A spool or reel 12 of insulating tape 14 and a spool or reel 16 of bare wire 18 are also provided. A turn of tape 14 is first wound on winding form 10 and then a turn of bare wire 18 is wound on such tape. The following turn of tape is then wound to overlie the first turn of wire 18 and extend beyond such wire on to the winding form. The next turn of the bare wire is wound overlying the second turn of the tape and beside the first turn of wire thereby pulling the tape down between the adjacent turns of the wire.

As will be understood the wire 18 and the tape 14 are spirally wound on the winding form 10. The first layer is wound from one side to the other, while the next layer will begin at such other side and be wound back to the first side. As each wire turn is placed beside the previous turn the extending insulation tape will be pulled down between the turns providing turn to turn insulation. The tape above and below each turn will provide the desired layer insulation. This construction will be clear from the following description considered with reference to FIGURE 2.

Figure 2:
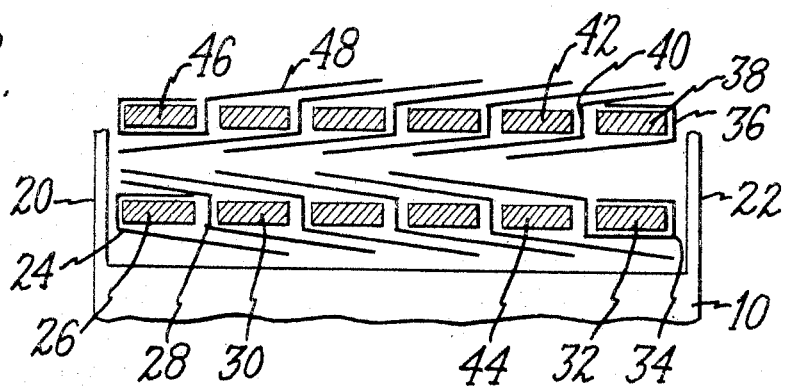
FIGURE 2 is an exploded view of a portion of a coil winding form and a coil wound thereon according to a preferred form of this invention.

Considering now FIGURE 2, there is shown an exploded view of a portion of a coil winding form and a coil wound thereon according to the preferred form of this invention. Only a portion of coil winding form 10 is shown and it may be provided with flanges 20, 22 on each side thereof if desired. Obviously, flanges 20, 22 could extend as far as desired above the winding form 10 or they could be eliminated, if desired. As is shown in FIGURE 2, the first turn 24 of the insulating tape is wound on winding form 10. Then the first turn 26 of the bare wire is wound on top of the first turn 24 of the tape. The bare wire turn 26 is preferably placed close to the center of tape turn 24 such that a portion of the tape extends beyond each side of the bare wire turn 26 in the manner particularly shown in FIGURE 2. It is desirable that the outer portion of tape turn 24 be folded over the top of wire turn 26 as shown to cover the edge of the turn 26. This may be done in any desired manner either manually or automatically by means of a forming member (not shown) on the flange 20 of the winding form 10. The next turn 28 of the tape is placed on top of wire turn 26 extending beyond such turn and on to the winding form 10. As the second turn 30 of the wire is wound beside turn 26 the tape turn 28 will be pulled down between wire turns 26 and 30 forming turn to turn insulation. The remainder of tape turn 28 is under wire turn 30 forming a portion of layer insulation. As is shown in FIGURE 2 a portion of tape turn 24 and a portion of tape turn 28 underlie wire turn 30 providing two layers of layer insulation.

The coil is wound across the coil form 10 with each succeeding wire turn pulling the previous tape turn down, as is shown, to form turn to turn insulation. The last turn 32 of wire in the first layer pulls down the tape turn 34, as indicated in FIGURE 2. Again, it is desired that the extending portion of tape turn 34 be folded over wire turn 32 to provide desired edge insulation. This folding over may be done in any manner, as previously explained. Also as will be apparent the folded portion will also provide a portion of layer insulation.

The next turn 36 of the insulating tape is wound over the last wire turn 32 to begin the second layer of the coil. Wire turn 38 is then wound over tape turn 36 and the extending portion of tape turn 36 folded over wire turn 38 to provide desired edge insulation. As is apparent from FIGURE 2, the folded-over portion of tape turn 34 and the bottom portion of tape turn 36 provide two thicknesses of insulation tape as layer insulation. Since the voltage gradient between these turns in each layer is very small, two thicknesses of insulation will be sufficient for the layer insulation. The next turn 40 of tape is wound over wire 38 and extends into the winding form 10 on top of the first layer as shown. The wire turn 42 is then placed beside wire turn 38 pulling the extending portion of tape turn 40 down between wire turns 38 and 42 as is shown. The position of tape turns 36 and 40 together with a portion of tape turn 34 provide the layer insulation between wire turn 42 in the second layer and wire turn 44 in the first layer.

The winding of the second layer will continue in this manner placing the one thickness of insulating tape 14 between each of the turns of bare wire 18. As shown, all the other turns of wire in the second layer will be provided with four thicknesses of insulating tape as layer insulation between the second layer turn and the first layer turns. As in the first layer, the last turn 46 of the wire will pull down turn 48 of the insulating tape to form the turn insulation and a portion of the layer insulation. Tape turn 48 is also folded over wire turn 46 to form edge insulation for wire turn 46. It also forms a portion of the next layer insulation. In the particular embodiment shown, it will be noted that five thicknesses of tape form the layer insulation between wire turn 46 and wire turn 26. This is considered desirable since the greatest voltage gradient will appear between these two turns in the first and second layer of the winding.

It will be understood that each succeeding layer of the coil will be wound in a similar manner. After the coil has been completely wound a final layer of tape 14 may be wound around the outside of the finished coil to hold down the extending portions of the various turns of tape, in the outer layer.

Figure 3:
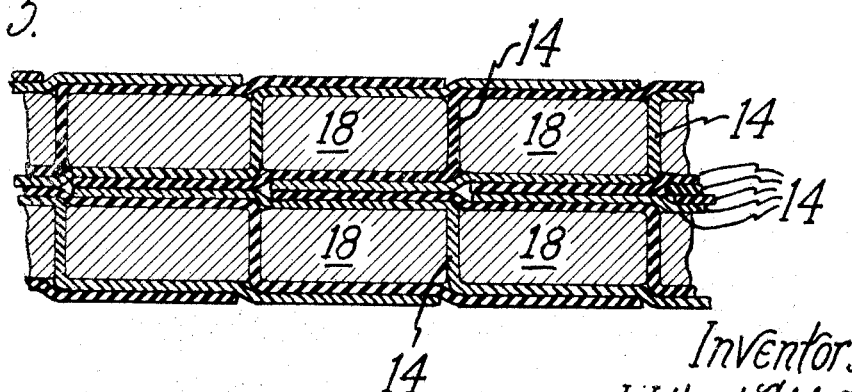
FIGURE 3 is an enlarged sectional view of a portion of a coil wound according to the preferred form shown in FIGURE 2.

FIGURE 3 shows a partial sectional view of a coil wound according to the preferred method of FIGURE 2. As can be seen in FIGURE 3, each turn of bare wire 18 in each layer is provided with a single thickness of insulating tape 14 as the turn to turn insulation. The layer insulation is provided by a plurality of thicknesses of tape 14, four being shown in FIGURE 3.

The number of thicknesses of insulated tape 14 between the various layers will, of course, depend on the rating of the coil. It can be increased or decreased by varying the width of the insulating tape used. The following formula has been used to determine the width of the insulating tape 14 for use with rectangular conductors:

$$Z = (A)\ W + T + 0.2$$

Where Z is the tape width in inches, W is the width of the rectangular conductor in inches, T is the conductor thickness in inches and 0.2 is a lap-over factor. A is the desired number of thicknesses of insulating tape to be used as the layer insulation. Where four thicknesses are desired as in FIGURES 2 and 3 the above formula would be:

$$Z = 4\ W + T + 0.2$$

Using a 0.005-inch thick tape this would provide turn to turn insulation of 0.005 inch and layer insulation of 0.020 inch. In one winding using a rectangular conductor of 0.080 x 0.065 inch with four thicknesses desired as layer insulation, the tape width calculated was 0.585 inch.

For round conductors the following formula is used to calculate tape width:

$$Z = (A)\ D + 0.57\ D + 0.10$$

Where Z is the tape width in inches, D is the wire diameter in inches, A is the number of thicknesses of tape desired as layer insulation, 0.57 D is the thickness factor and 0.1 is a lap-over factor.

It will be clear that any desired type of insulation tape may be used to form the coil insulation. A preferred type of insulating tape is kraft crepe paper tape since this type will readily bend both around the bare wire as well as bending around the coil form. Various types of plastic insulating tapes may also be used. Further it will be apparent that the insulating tape could be formed around a portion of the bare wire conductor as the conductor is being fed to the coil winding form. These and other changes in the construction may be made without departing from the scope of this invention for simultaneously applying both turn to turn and layer to layer insulation to a bare wire as such wire is wound into a coil.

From the above it will be apparent that by means of this invention there is provided a novel coil with a novel method of making such coil that fulfills all the objects hereinbefore set forth. What is claimed as the invention is set forth in the appended claims.

What is claimed as new and which it is desired to secure by Letters Patent of the United States is:

1. A method of making a wound coil for electrical apparatus in which the turn to turn and layer to layer insulation is applied to the bare wire as the coil is wound comprising the steps of:
   (A) providing a coil form, a reel of bare wire and a reel of insulating tape;
   (B) laying a first turn of said insulating tape from said tape reel on said winding form;
   (C) laying a first turn of said bare wire on said insulating tape from said wire reel;
       (1) portions of said insulating tape extending on both sides of said bare wire;
   (D) laying a second turn of said tape on said first turn of said wire;
       (1) said second turn of said tape having a portion extending beyond said first turn of said wire and on to said winding form;
   (E) laying a second turn of said wire on said second turn of said tape and beside said first turn of said wire thereby pulling said second turn of said tape between said first and said second turns of said wire;
       (1) a portion of said first and said second turn of said tape underlying said second turn of said wire;
       (2) a further portion of said second turn of said tape extending beyond said second turn of said wire;
   (F) continuing laying turns of said insulating tape and said bare wire back and forth across said winding form to form an insulated coil in which said portions of said tape between turns of said wire form turn to turn insulations and said portions of said tape underlying turns of said wire forming layer to layer insulation.

2. A method of making a wound coil as set forth in claim 1 in which said insulating tape is crepe paper.

3. An insulated coil for an electrical apparatus comprising in combination:
   (A) a plurality of turns of bare wire spirally wound to form a coil;
   (B) a plurality of turns of insulating tape spirally wound to provide insulation for said turns of bare wire;
       (1) each said turn of tape having portions which overlie at least one turn of said wire and portions which underlie at least two adjacent turns of said bare wire with a portion of said turn of tape between adjacent turns of said wire and
       (2) said portions of said tape turns which overlie and underlie said wire turns providing layer insulation and said portions between adjacent turns of said wire forming turn to turn insulation.

4. A method of making a wound coil for electrical apparatus in which the turn to turn and layer to layer insulation is applied to the bare wire as the coil is wound comprising the steps of:
   (A) providing a coil form, a reel of bare wire and a reel of insulating tape;
   (B) laying a first turn of said insulating tape from said tape reel on said winding form;
   (C) laying a first turn of said bare wire on said insulating tape from said wire reel;
       (1) portions of said insulating tape extending on both sides of said bare wire;
   (D) laying a second turn of said tape on said first turn of said wire;
       (1) said second turn of said tape having a portion extending beyond said first turn of said wire and on to said winding form;
   (E) laying a second turn of said wire on said second turn of said tape and beside said first turn of said wire thereby pulling said second turn of said tape between said first and said second turns of said wire;
       (1) a portion of said first and said second turn of said tape underlying said second turn of said wire;
   (F) continuing laying turns of said insulating tape and said bare wire back and forth across said winding form to form an insulated coil in which said portions of said tape between turns of said wire form turn to turn insulations and said portions of said tape underlying turns of said wire forming layer to layer insulation;
   (G) and with the end turns of said tape underlying the end turns of said wire being folded over said wire turns to form edge insulation.

5. An insulated coil for an electrical apparatus as set forth in claim 3 in which the end turns of said tape in each layer underlie and overlie the end turns of said bare wire with portions of said end turns of said tape covering the outer edge of said end turns of said bare wire to form edge insulation therefor.

References Cited

UNITED STATES PATENTS

| 762,112 | 6/1904 | Apple | 336—206 |
| 1,011,791 | 12/1911 | Honold | 336—206 |
| 1,381,567 | 6/1921 | Küttner | 336—206 XR |
| 1,932,640 | 10/1933 | Rust | 336—206 XR |

FOREIGN PATENTS 538,840  12/1955  Belgium.

LEWIS H. MYERS, *Primary Examiner.*

THOMAS J. KOZMA, *Assistant Examiner.*

U.S. Cl. X.R.

29—605